(12) United States Patent
Evans et al.

(10) Patent No.: US 6,772,555 B2
(45) Date of Patent: Aug. 10, 2004

(54) MODULAR LARGE ANIMAL TRAP

(76) Inventors: Douglas K. Evans, 6434 Lindyann La., Houston, TX (US) 77008; Bradley D. Parish, 1402 W. Stroker Rd., Crosby, TX (US) 77532

( * ) Notice: Subject to any disclaimer, the term of this patent is extended or adjusted under 35 U.S.C. 154(b) by 0 days.

(21) Appl. No.: 10/726,235

(22) Filed: Dec. 2, 2003

(65) Prior Publication Data

US 2004/0107630 A1 Jun. 10, 2004

(51) Int. Cl.[7] .............................................. A01M 23/02
(52) U.S. Cl. ........................................................... 43/61
(58) Field of Search .............................. 43/61; 119/474

(56) References Cited

U.S. PATENT DOCUMENTS

| | | | |
|---|---|---|---|
| 986,010 A | * | 3/1911 | Kennedy ........................ 43/61 |
| 1,255,798 A | * | 2/1918 | Schuckman .................... 43/61 |
| 1,815,541 A | * | 7/1931 | Lee ................................ 43/61 |
| 1,918,266 A | * | 7/1933 | Henry ............................. 43/61 |
| 2,478,605 A | * | 8/1949 | Symens .......................... 43/61 |
| 2,594,855 A | * | 4/1952 | Bloodgood ..................... 43/61 |
| 3,116,847 A | * | 1/1964 | Collins ..................... 217/12 R |
| 3,834,063 A | * | 9/1974 | Souza et al. .................... 43/61 |
| 4,342,172 A | * | 8/1982 | Guanci .......................... 43/61 |
| 4,706,406 A | * | 11/1987 | Mowatt et al. ................. 43/61 |
| 4,819,582 A | * | 4/1989 | Lichvar ....................... 119/474 |
| 5,199,210 A | * | 4/1993 | Nastas ............................ 43/61 |
| 5,452,681 A | * | 9/1995 | Ho .............................. 119/498 |
| 5,862,624 A | * | 1/1999 | Askins ........................... 43/61 |
| 5,864,982 A | * | 2/1999 | Tully et al. ..................... 43/61 |
| 6,152,081 A | * | 11/2000 | Baker .......................... 119/498 |

* cited by examiner

Primary Examiner—Charles T. Jordan
Assistant Examiner—Jordan Lofdahl
(74) Attorney, Agent, or Firm—David W. Alexander (57) ABSTRACT

A large animal trap for humanely capturing and restraining large feral animals, particularly feral hogs, is disclosed which is field assembled from pre-manufactured modular components. Animals are enticed into the trap by an animal baiting means. A sliding gate supported and released by a sliding gate latch means and gate locking means are further disclosed, which traps the animal once triggered and prevents the animal from raising the gate. The modular components are in the shape of flat square or rectangular wire mesh panels framed by square tubing. The sizes and in the shape of the modular components are especially advantageous for ease of transport to remote trapping locations. Once the individual components are placed in their proper positions to form the trap, they are joined together by fasteners, not requiring tools to secure. Said fasteners may be later removed when the user disassembles the trap.

9 Claims, 6 Drawing Sheets

MODULAR LARGE ANIMAL TRAP

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION (1) Field of the Invention

This invention relates to the field of traps which capture and hold large feral animals without harm or injury in a field-erected cage. This invention further relates to the field of traps which capture the feral animal by the closing of a gravity-actuated downward sliding gate at the trap entrance, the door being released by a closure mechanism tripped by the animal's attempt to reach bait The invention still further relates to the field of traps which are constructed of pre-manufactured modular components, shipped disassembled, and assembled at the point of use without tools.

As suburbia expands into ever more rural areas; large animals, such as coyotes, wolves, feral hogs, and other non-game animals lose habitat and become dangerous nuisances. To trap such animals, homeowners and trappers have relied on large pre-assembled cages that occupy a large shipping volume, are costly to ship, and difficult to handle. There is a need for a trap capable of capturing large feral animals which is light weight, economical to ship, easy to assemble and disassemble without tools, and effective in capturing and detaining large animals without injury. The present invention satisfies these industry needs, among other demands.

(2) Description of the Related Art Including Information Disclosed Under 37 C.F.R. 1.97 and 1.98

Animal traps exist which permit the humane capture of animals. Humane capture is especially desirable for the trapping of rodents which inhabit dwelling, such as mice or rats. Numerous types of traps have been devised which effect the capture of these and other small animals without injury (see, for example, U.S. Pat. Nos. 1,453,795; 2,167,291; 2,725,661; 3,975,857; 4,590,703; 4,682,440; 4,831,766; 4,926,581; 5,778,594; 5,845,432; and 5,864,982 and U.S. patent application Ser. Nos. 20020035801; 20020066222; 20020178657; 20020184812; 20030019148; and 20030084603). However, these traps have intricate designs and are not large or strong enough to contain a large feral animal, such as a coyote, wolf, or feral hog.

Consequently, a need exists for an animal trap which is both safe and effective in the humane capture of large animals, especially feral hogs, and is readily manufactured. Traps currently used to capture large feral animals are heavy, bulky, occupy a large shipping volume, and are difficult to transport to inaccessible areas. Many such traps do not break down for shipment and are essentially welded-wire cages configured around a three-dimensional flame of angle-iron or tubular metal. The present invention provides such a design having these and other advancements compared to the prior art.

BRIEF SUMMARY OF THE INVENTION

Throughout the brief summary of the invention, the right and left sides are those sides as viewed from a position in front of the trap and looking toward such trap.

The present invention is a trap which is a cage formed from seven (7) modular components; i.e., six (6) wire-mesh panels and one (1) frame for a sliding gate. Five (5) of the wire-mesh panels and the frame are joined together by fasteners, not requiring tools to secure, to form the trap. The frame contains the sixth (6th) wire mesh panel which, when released, slides downward thereby trapping any feral animal within the cage.

The periphery of each of the six (6) wire mesh panels and one (1) sliding gate frame are in the shape of a square or rectangle, depending on its position in the cage. The periphery structures of the wire mesh panels are constructed of metal tubular stock to form frames. Wire mesh, sized by cutting to be slightly smaller than the periphery of each frame to avoid protrusion, is welded to each of the six (6) frames to form a modular component. The frame for the sliding gate is similarly constructed of metal tubular stock. Channel iron is welded to the insides of the vertical and bottom metal tubular stock forming the periphery of the sliding gate frame to create runners and bottom support for the sliding gate. All of the components are light enough so that one (1) or two (2) persons may easily move them from place-to-place and join them together with minimal assistance.

Each wire mesh panel and frame for the sliding date contains holes drilled at various points in their frames. The holes penetrate at least two (2) frames when they are joined in the proper position. When the holes in the two (2) adjoining panels are matched, the frames are joined together by adjustable clevis pins, which rigidly hold the assembly together. Each adjustable clevis pin is kept in place by a hair pin cotter.

The sliding gate is fitted inside of the two (2) vertical runners of the sliding gate frame with sufficient clearance to allow it to freely slide up and down. The height of the two (2) vertical runners is approximately twice the height of the assembled cage. In this manner, the sliding gate may be raised to a point where its bottom is at the same elevation as the top of the cage and still be contained within the two (2) vertical runners.

A sliding gate latch means is comprised of a trigger latch mounted on the front right of the top panel. The trigger latch is armed by raising the sliding gate until its lower frame member is slightly above the top of the trigger latch. The trigger latch is then rotated counter clockwise until it obstructs the downward movement of the sliding gate.

A sliding gate locking means is formed from a pop-pin welded to the front frame piece of the top panel and to the right of the trigger latch. The pop-pin contains a spring-loaded pin, which, when in its rest position, protrudes towards the front of the cage. The front of the spring-loaded pin rides along the right vertical frame member of the sliding gate. As the sliding gate reaches its fully lowered position, the pin is no longer obstructed by the gate's vertical frame member and spring-loading causes the pin to move forward. The pin extends over the top of the sliding gate, thereby preventing the gate from being raised without first again retracting the spring-loaded pin.

Assembly of the trap proceeds by placing the bottom panel on the ground, joining the side and rear panels one-by-one until these four (4) panels forming the bottom, sides and rear are joined by proper alignment and pinning. The top panel is then joined to the other four (4) panels.

After the five (5) wire mesh panels forming the top, bottom, sides and rear are assembled and pinned, the frame containing the sliding gate is pinned to the structure. The gate is then raised by hand to its upper most position and the trigger latch is rotated counter clockwise until it obstructs the downward movement of the sliding gate, thereby holding the gate in its raised position.

The trigger latch is connected to one end of a lanyard which is threaded through safety spring hooks causing the lanyard to pass across the inside of the trap some suitable distance from the rear. The other end of the lanyard is tied to another safety spring hook.

A container or tray containing bait suitable for the animal to be trapped is placed on the floor behind the lanyard. As the animal approaches the container or tray, it encounters the lanyard and pushes it aside or rearward. The movement of the lanyard rotates the trigger latch clockwise as viewed from above causing the sliding gate to drop suddenly thereby trapping the animal.

As the top horizontal frame member of the sliding gate drops below the pop-pin, the spring-loaded pin slides home towards the front of the cage and beyond this frame member. The sliding pin prevents the gate from being raised from the inside or outside by an animal with sufficient time, intelligence, strength, or dexterity to do so.

Mesh with variable size openings may be used for selected areas of the trap. The panels may be constructed of many different sizes based on the size and strength of the animal to be captured. The door may be fitted with friction resistant material to further ensure smooth operation to overcome the effects of surface corrosion and adverse weather conditions. The lanyard forming the trigger cable may be constructed of any material suitable to form a flexible string or be coated to reduce friction or to resist damage by ultraviolet light, ozone, and other constituents of rain and air.

Additional features and advantages of the invention will become apparent from the ensuing description and claims when read in conjunction with the attached drawings.

BRIEF DESCRIPTION OF THE SEVERAL VIEWS OF THE DRAWINGS

Drawing Figures

REFERENCE NUMERALS USED IN DRAWINGS

| 20 | Trap | 22 | Bottom panel |
|---|---|---|---|
| 24 | Right side panel (as viewed from the front of the trap) | 26 | Left side panel (as viewed from the front of the trap) |
| 28 | Top panel | 30 | Rear panel |
| 32 | Sliding gate frame | 34 | Sliding gate |
| 36 | Pop-pin | 38 | Adjustable clevis pin |
| 40 | Hair pin cotter | 42a | Safety spring hook |
| 42b | Safety spring hook | 42c | Safety spring hook |
| 44 | Lanyard | 46 | Square tubing (general) |
| 48 | Weld point for square tubing-to-square tubing | 50 | Hole drilled in frame for adjustable clevis pin |
| 52 | Frame (general) | 54 | Pan containing bait |
| 56 | Wire mesh | 58 | Head of 38 |
| 60 | End opposite head 58 of 38 | 62 | Holes drilled in 38 |
| 64 | Weld points for 56 to 52 | 66 | Trigger latch |
| 68a | Square tubing reinforcement for left side panel, 26 | 68b | Square tubing reinforcement for right side panel, 24 |
| 70a | Square tubing vertical - Left (Sliding gate frame) | 70b | Square tubing vertical - Right (Sliding gate frame) |
| 72a | Square tubing horizontal - Upper (Sliding gate frame 32) | 72b | Square tubing horizontal - Lower (Sliding gate frame 32) |
| 74 | Channel iron vertical (attached to 70A and 70b) | 76 | Channel iron horizontal (attached to 72b) |
| 78 | Hole in latch for lanyard | 80 | Weld point for 36 to 52 |

| | | | |
|---|---|---|---|
| 82 | Hole in latch for adjustable clevis pin | 84 | Hole in adjustable clevis pin closest to 46 |
| 86 | Weld point for 58 to 52 | 88 | Pin protruding from pop-pin |
| 90 | Right vertical frame member of sliding gate 34 | 92 | Knob of pop-pin |
| 94 | Arm on trigger latch 66 for support of sliding gate 34 | | |

DETAILED DESCRIPTION OF THE INVENTION

Throughout the detailed description of this invention, the right and left sides are those sides as viewed from a position in front of the trap and looking toward such trap.

Detailed Description of the Preferred Embodiment

The shapes of the components of the invention described herein depict the preferred embodiment. In other embodiments, the shapes of the same components may be different than those of the preferred embodiment depending on the size and strength of the animal to be captured.

Figure 1:
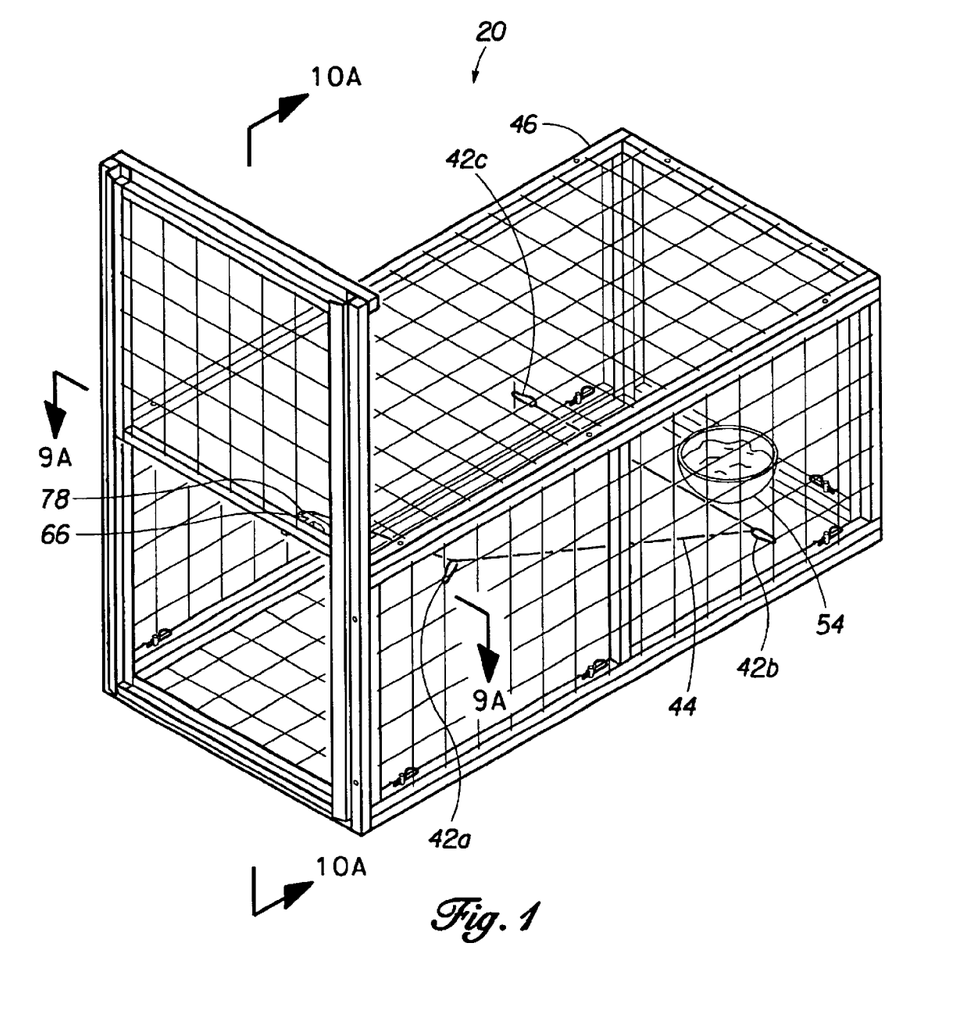
FIG. 1 is a perspective view of the modular large animal trap according to the invention herein shown in an erected position.
Figures 2, 3:
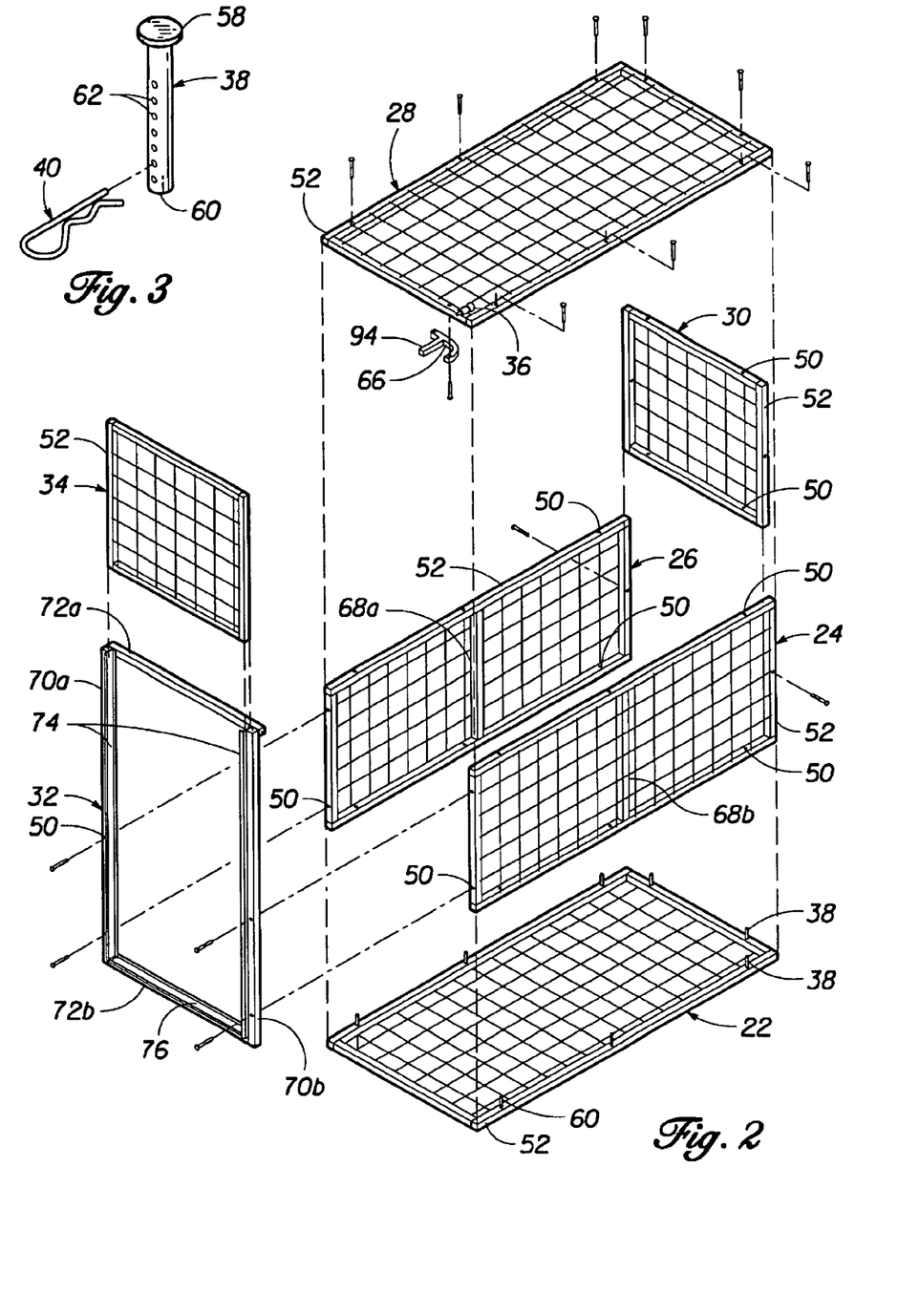
FIG. 2 is an exploded perspective view of the invention.
FIG. 3 is a detail view of the adjustable clevis pin and hair pin cotter.

The trap 20 shown in FIG. 1 comprises, as most clearly seen in exploded view, FIG. 2, a rectangular wire mesh panel 22 forming the bottom, a rectangular wire mesh panel 24 forming the right side, a rectangular wire mesh panel 26 forming the left side, a rectangular wire mesh panel 28 serving as the top, a nominally square wire mesh panel 30 forming the rear, a rectangular frame 32 serving as a support for the sliding gate, and a nominally square wire mesh panel 34 forming the sliding gate. The trap further comprises, a sliding gate latch means, trigger latch 66, for holding the sliding gate in the open position and for releasing said gate, a sliding gate locking means, pop-pin 36, for locking the sliding gate after it has dropped to the closed position, and frame securing means, comprised of a predetermined number of adjustable clevis pins 38 with the same predetermined number of hair pin cotters 40.

The trap 20, as shown in FIG. 1, still further comprises, a predetermined number of latch releasing support means comprised of safety spring hooks 42a, 42b and 42c, latch releasing means comprising lanyard 44, and an animal baiting means comprised of a bait container 54.

Figure 4:
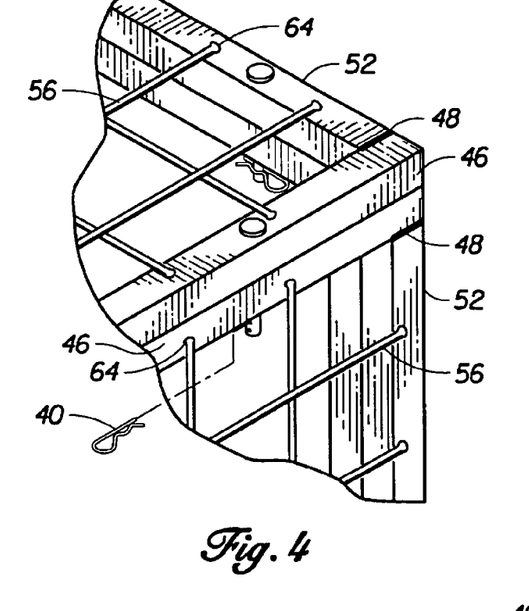
FIG. 4 is an isometric detail view showing a section of the top panel joined to right side panel.
Figure 6:
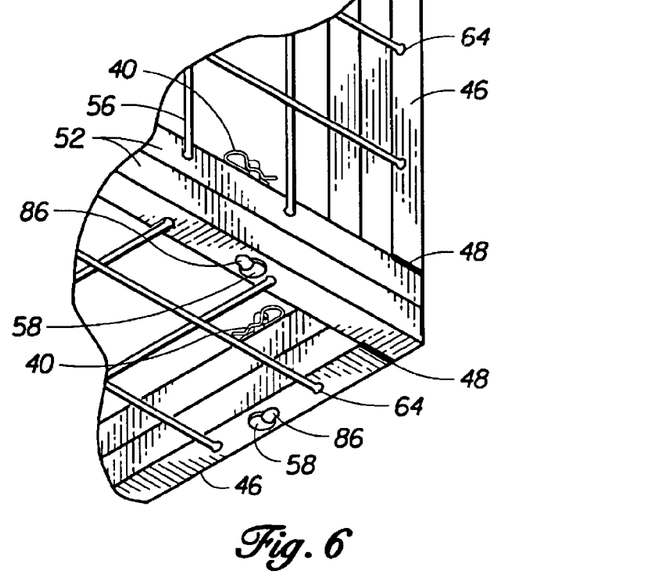
FIG. 6 is an isometric detail view showing a section of the bottom panel joined to the right side panel as viewed from the ground looking up at the bottom panel.

Wire mesh panels 22, 24, 26, 28, 30 and sliding gate 34, all depicted in FIG. 2, are fabricated by similar means from similar components. As shown in detail in FIGS. 4 and 6, frames for each wire mesh panel and the sliding gate of predetermined shapes and sizes are constructed from structural member means comprising square tubing 46 of carbon steel joined together by joining means comprised of any one or more of the electric-arc or beam welding methods; i.e., electron beam welding, flux cored arc welding, gas metal arc welding, gas tungsten arc welding, laser beam welding, resistance spot welding, or shielded metal arc welding, at points 48 to form frames 52 for the wire mesh panels and frame 32 for the sliding gate. Shapes and sizes of frames 52 for items 22, 24, 26, 26, 30 and 34 and frame 32 are determined by the size and strength of the animal to be captured, which in turn establishes the overall size of trap 20. In the preferred embodiment depicted in FIG. 2, wire mesh panels, 24 and 26 are further reinforced with square tubing 68b and 68a, respectively.

Animal restraining means comprised of wire mesh 56 fabricated of wire with predetermined wire diameter and opening is cut to dimensions slightly smaller than the outside perimeters of each of frames 52. The wire diameter and opening of wire mesh 56 is determined by the size and strength of the animal to be captured. The resulting sections of wire mesh 56 are laid upon their respective frames and each wire of 56 contacting the perimeter of each frame is joined to square tubing 46 at points 64 by joining means comprised of any one or more of the electric-arc or beam welding methods; i.e., electron beam welding, flux cored arc welding, gas metal arc welding, gas tungsten arc welding, laser beam welding, resistance spot welding, or shielded metal arc welding electric-arc welding, shown typically in FIGS. 4, 6, 8A, 8B, 9A and 9B.

Figure 8A:
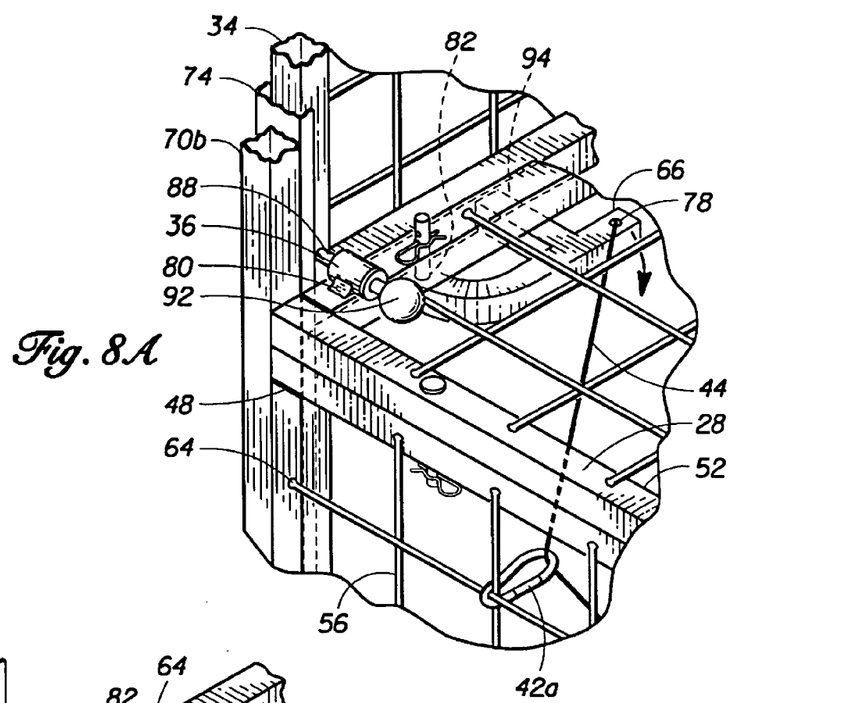
FIG. 8A is an isometric detail view showing the position of the pop-pin and trigger latch with the sliding gate elevated.
Figure 8B:
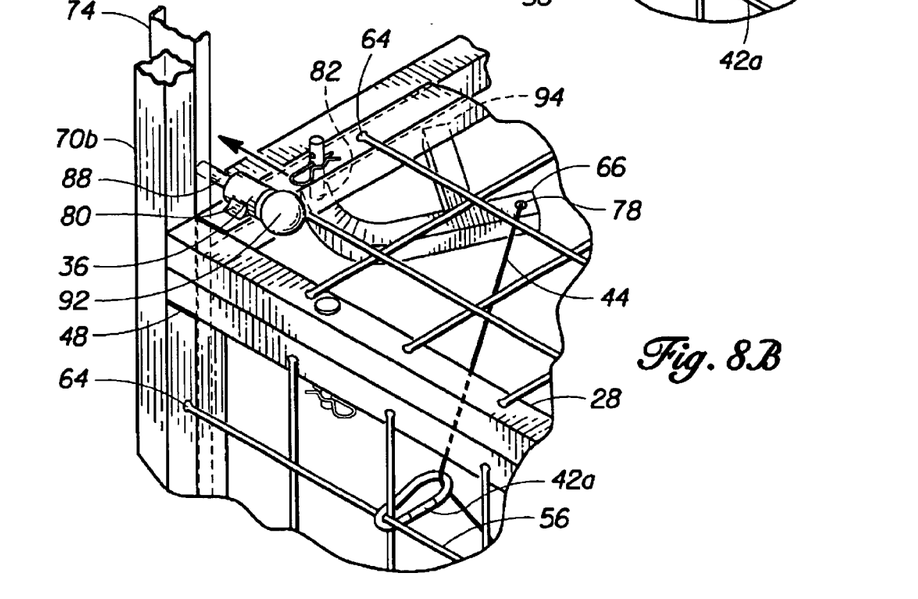
FIG. 8B is an isometric detail view showing the position of the pop-pin and trigger latch after the sliding gate has fallen.

Frame 32 for sliding gate 34, shown in FIG. 2, is formed from four (4) pieces of square tubing 46, items 70a, 70b, 72a, 72b joined together by joining means comprised of any one or more of the electric-arc or beam welding methods; i.e., electron beam welding, flux cored arc welding, gas metal arc welding, gas tungsten arc welding, laser beam welding, resistance spot welding, or shielded metal arc welding electric-arc welding. Sliding gate restraining means comprised of pieces of channel iron, items 74 and 76, of predetermined size based on the dimensions of 70a, 70b, and 72b are joined to the insides of 70a, 70b, and 72b, by joining means comprised of any one or more of the electric-arc or beam welding methods; i.e., electron beam welding, flux cored arc welding, gas metal arc welding, gas tungsten arc welding, laser beam welding, resistance spot welding, or shielded metal arc welding electric-arc welding such that the troughs of 74 and 76 face the inside of 32. FIGS. 8A and 8B most clearly show the position of item 74 welded to 70b.

As shown in FIG. 2, a predetermined number of holes 50 of predetermined diameter are drilled through frames 52 forming 22, 24, 26, 28, 30, and 32. The number of holes 50 is determined by the size of wire mesh panels 22, 24, 26, 28, 30, and sliding gate frame 32 and the strength of the animal to be captured. The diameter of each of 50 is determined by the outside diameter of adjustable clevis pin 38, which must easily pass through hole 50, shown in the detail views of FIGS. 5 and 7. Each hole 50 is drilled such that it penetrates two (2) adjacent frames after they are mounted in their proper positions.

Wire mesh panels 22, 24, 26, 28, 30, and sliding gate frame 32 are joined together by a predetermined number of adjustable clevis pins, 38, which are further secured by the same number of hair pin cotters, 40. FIG. 3 shows a detail view of an adjustable clevis pin 38 and hair pin cotter 40. One end of 38 is flattened to form a head 58. The end opposite 60 of head 58 contains a predetermined number of holes 62 of diameter slightly larger than the predetermined diameter of hair pin cotter 40. All of the holes 62 are drilled with the same radial angle so that they form a line of holes 62 along the length of 38.

Figure 5:
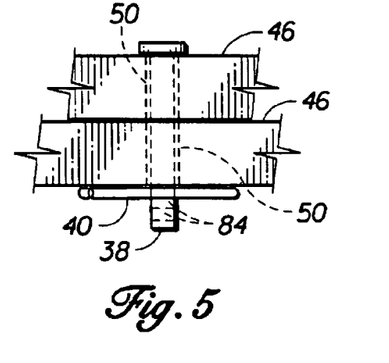
FIG. 5 shows a detail view of an adjustable clevis pin and hair pin cotter connecting two adjacent upper panels.

FIG. 5 shows a detail view of a typical loose adjustable clevis pin 38 and hair pin cotter 40 joining two (2) pieces of square tubing 46. As shown in FIG. 5, once an adjustable clevis pin 38 is in pushed home through hole 50, hair pin cotter 40 is pushed through the hole 84 closest to the nearest 46.

Figure 7:
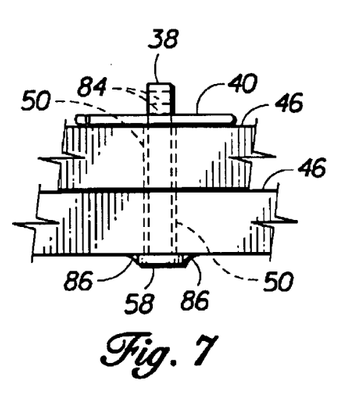
FIG. 7 shows a detail view of an adjustable clevis pin, with head welded to the frame member of the bottom panel, and hair pin cotter connecting two adjacent panels.

As depicted in FIG. 2, bottom wire mesh panel 22 has a predetermined number of adjustable clevis pins 38 already fitted in place. The heads 58 of the number of adjustable clevis pins 38 equal to the number of holes 50 drilled in frame 52 of item 22 are joined to 52 by joining means comprised of any one or more of the electric-arc or beam welding methods; i.e., electron beam welding, flux cored arc welding, gas metal arc welding, gas tungsten arc welding, laser beam welding, resistance spot welding, or shielded metal arc welding, at points 86 to the bottom of such frame, shown in detail in FIG. 6. FIG. 7 shows a detail view of an adjustable clevis pin 38 with its head 58 joined at point 86 to the bottom of 46 forming the frame 52 of wire mesh panel 22. As shown in FIG. 7, each adjustable clevis pin 38 is further secured by hair pin cotter 40 pushed home through hole 84 closest to the adjacent 46.

Figure 9A:
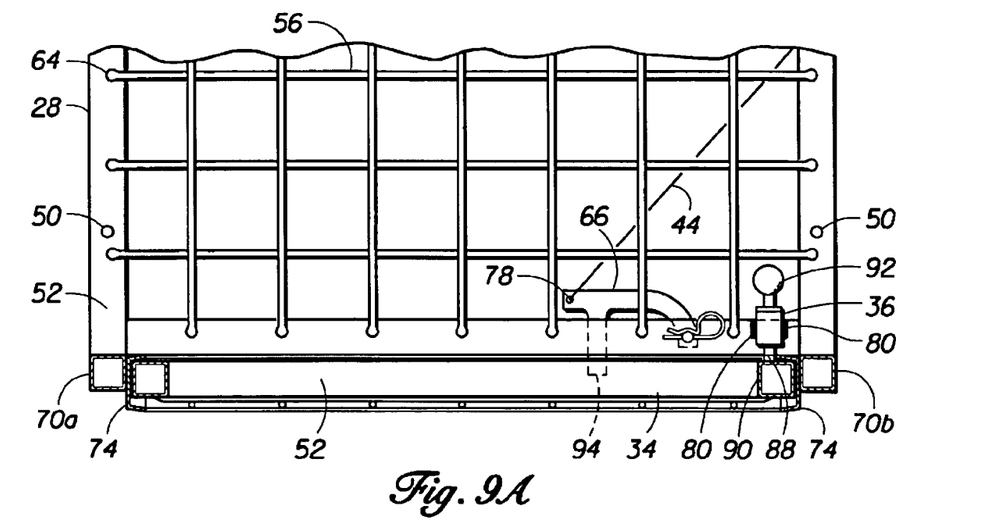
FIG. 9A is a plan view of the top of the sliding gate area with the gate in its elevated position.

FIGS. 2, 8A, 8B, 9A, 9B, 10A, and 10B show the sliding gate locking means, pop-pin 36. As shown in FIG. 2 and in detail in FIGS. 8A and 8B, pop-pin 36 is joined by joining means comprised of any one or more of the electric-arc or beam welding methods; i.e., electron beam welding, flux cored arc welding, gas metal arc welding, gas tungsten arc welding, laser beam welding, resistance spot welding, or shielded metal arc welding, at point 80 to the front right of frame 52 forming wire mesh panel 28. FIG. 9A, a view looking down on the sliding gate 34 in its elevated position, shows item 36 positioned so that its body-barrel does not extend beyond the outer perimeter of frame 52.

As shown in FIG. 9A, item 36 is further positioned so that retractable pin 88 protrudes beyond 52 and contacts the right vertical frame member 90 of sliding gate 34 when 34 is in its elevated position, being supported by arm 94 on item 66. After sliding gate 34 has been released by 66 and fallen to its rest position, depicted in FIG. 9B, retractable pin 88 extends beyond the top of frame 52 of sliding gate 34.

Figure 10A:
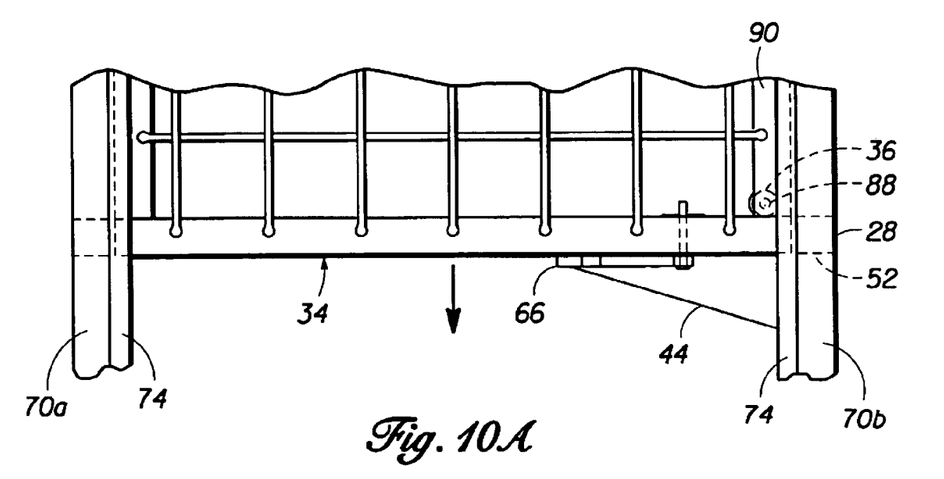
FIG. 10A is an elevation view of the front top portion of the sliding gate with the gate in its elevated position.
Figure 10B:
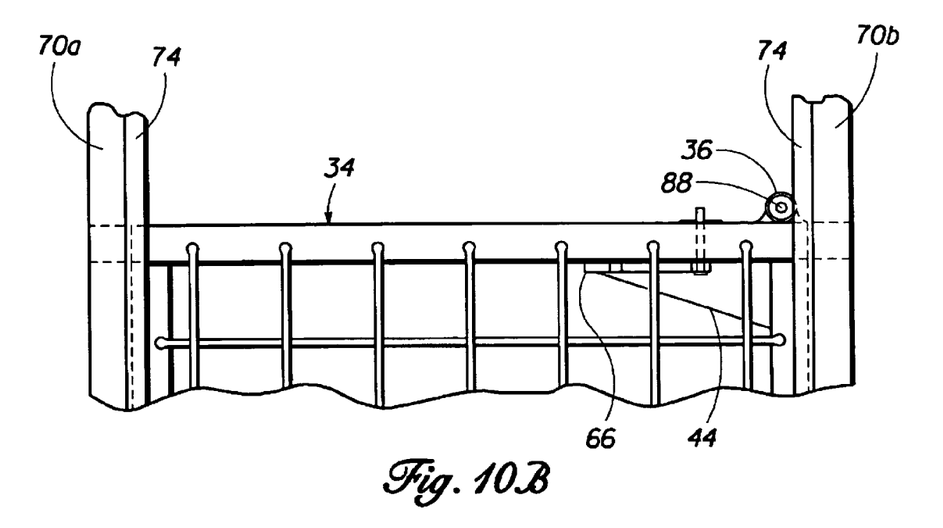
FIG. 10B is an elevation view of the front top portion of the sliding gate after the gate has fallen.

FIG. 10A further depicts, in elevation view, the relative positions of pop-pin 36 and sliding gate 34 when 34 is elevated. Pop-pin 36 is mounted on top of frame 52 of wire mesh panel 28. With the sliding gate elevated, being supported by trigger latch 66, retractable pin 88 of item 36 contacts the approximate center of the right vertical frame member 90 of sliding gate 34. FIG. 10B still further depicts, in elevation view, the positions of pop-pin 36, retractable pin 88, and sliding gate 34 after 34 has been released and fallen to its rest position.

Figure 9B:
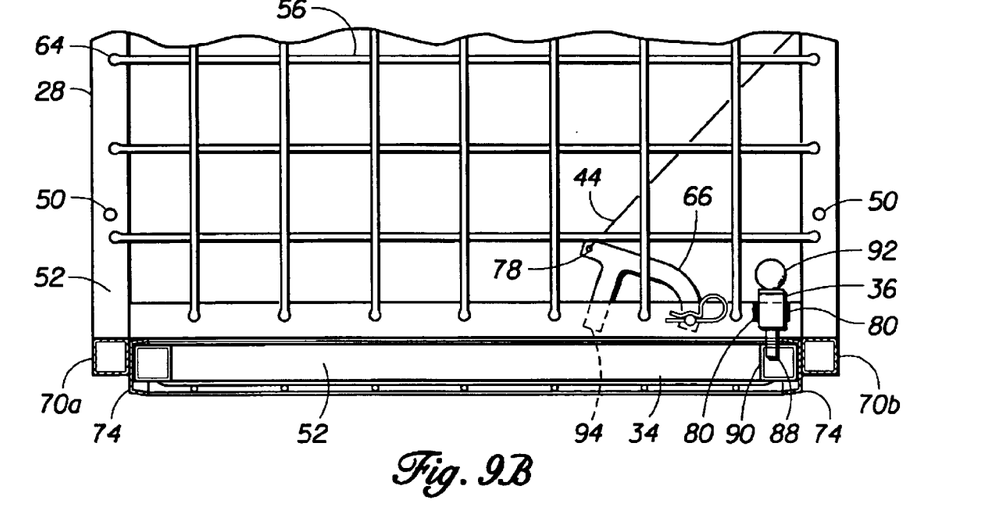
FIG. 9B is a plan view of the top of the sliding gate area after the gate has fallen.

FIG. 9B depicts the top of sliding gate 34 after the gate has fallen. In this view, retractable pin 88 is no longer restricted in its forward motion by right vertical frame member 90. After the gate has fallen, a spring in the body of 36, not depicted, causes retractable pin 88 to move towards the front of the trap to a position over the top of frame 52 forming sliding gate 34. Sliding gate 34 cannot be raised until knob 92 of 36 is pulled towards the rear of the trap causing 88 to no longer obstruct sliding gate 34. Once the gate is raised, pin 88 again contacts right vertical frame member 90 and the gate may be elevated to its armed position.

As shown in FIGS. 2, 8A, 8B, 9A, 9B, 10A, and 10B, trap 20 also comprises a sliding gate latch means, trigger latch 66, which supports sliding gate 34 before an animal has entered trap 20, and releases 34 after an animal has caused 66 to move in its attempt to reach the bait contained in 54.

As depicted in FIGS. 8A and 8B, trigger latch 66 is mounted to the left of pop-pin 36. It is through drilled with holes 78 and 82 of predetermined diameter and location. The diameter of hole 82 is slightly larger than the outside diameter of adjustable clevis pin 38. The diameter of hole 78 is slightly larger than the outside diameter of lanyard 44. Hole 82 is located on the end of 66 opposite that of hole 78. FIGS. 8A and 8B show hole 82 in 66 located directly below that hole 50 in frame 52 of wire mesh panel 28 drilled in 52 for mounting of 66. An adjustable clevis pin 38 is pushed upward through hole 82 in 66 and thence through hole 50 in frame 52 of 28. Once head 58 of 38 contacts frame 52, a hair pin cotter 40 is pushed home through hole 84 closest to the top of frame 52.

As further shown in FIGS. 8A and 8B, once trigger latch 66 is secured to frame 52 of 28 by adjustable clevis pin 38 and hair pin cotter 40, lanyard 44 is passed through 78 and tied in place. Lanyard 44 is then caused to pass through safety spring hook 42a.

Further Detailed Description of the Preferred Embodiment for the capture of Large Feral Hogs The shape of the trap, dimensions and materials of construction of the constituent parts, and the size of the pre-manufactured modular components are indicative of the best mode of carrying out the invention for the humane capture and restraint of large feral hogs. Modular large animal traps for the humane capture and restraint of other non-game feral animals, may be formed in other shapes, by constituent parts of other dimensions and materials of construction, from pre-manufactured modular components of different sizes and still be within the scope of the specification and the claims of the invention.

For the capture of large feral hogs, frames 52 of items 22, 24, 26, 28, 30 and 34 and sliding gate frame 32 are constructed of square tubing 46 which is nominally 25.4 mm (1 inch)×25.4 mm (1 inch) with an approximate 3.17 mm (⅛ inch) wall thickness. The nominal outer dimensions of frames 52 forming bottom panel 22 and top panel 28 are about 2,362.2 mm (93 inches) long by 1,193.8 mm (47 inches) wide; of frames 52 forming right side panel 24 and left side panel 26 are approximately 2,362.2 mm (93 inches) long by 914.4 mm (36 inches) high; of frame 52 forming rear panel 30 is about 1,143 mm (45 inches) wide by 914.4 mm (36 inches) high; of frame 52 forming sliding gate panel 34 is approximately 1,130.3 mm (44.5 inches) wide by 927.1 mm (36.5 inches) high; and of sliding gate frame 32 is about 1,917.7 mm (75.5 inches) 1,193.8 mm (47 inches) wide.

Wire mesh 56 selected for the capture of large feral hogs has nominal 152.4 mm (6 inch)×152.4 mm (6 inch) openings with wire of about 3.2 mm (⅛ inch) diameter or 6 gauge. Wire mesh of equivalent dimension and material of construction may be substituted.

Further, for the capture and restraint of feral hogs, holes 50 drilled through each of 52 forming items 22, 24, 26, 28, 30 and frame 32 have a nominal diameter of 10.3 mm (13/32 inch). The proximate location and number of the holes is shown in FIG. 2.

Still further, adjustable clevis pin 38, depicted in detail in FIG. 3, has an overall length from point 58 to point 60 of nominally 76.2 mm (3 inches) by about 7.94 mm (5/16 inch) diameter. It contains seven (7) holes 62 along its length, each hole 62 is about 3.18 mm (⅛ inch) in diameter. Hair pin cotter 40 is formed from wire with a diameter of about 1.83 mm (0.072 inch) and has an overall length of about 30.18 mm (1.2 inches). Adjustable clevis pin 38, with matching hair pin cotter 40, are available as part numbers ADJ-34 and HAIR-4, respectively, from Pivot Point, Inc., P.O. Box 488, Hustisford, Wis., 53034. Adjustable clevis pin 38 and hair pin cotter 40 of equivalent dimensions and materials of construction may be substituted.

Pop-pin 36 is available as part number P185E from Kamparts, Inc., 1311 Wanamaker Ave., Ontario, Calif. 91761. Pop-pin 36 of equivalent dimension and material of construction may be substituted.

Channel iron 74 and 76 have nominal dimensions of 38.1 mm (1.5 inch) by 19.1 mm (¾ inch) by 3.2 mm (1⅛ inch) and lengths of about 1,879.6 mm (74 inches) for 74 and approximately 1,143 mm (45 inches) for 76.

Safety spring hooks 42a, 42b, 42c, each have a metal shank of nominal diameter 6.4 mm (0.25 inch) by about 63.5 mm (2.5 inch) overall length. Said safety spring hooks are available as item number 701422 from Aubuchon Hardware, 95 Aubuchon Drive, Westminster Mass. 01473. Safety spring hook, 42a, 42b, 42c, of equivalent dimension and material of construction may be substituted.

Lanyard 44 is available from Frank W. Winne & Son, Inc., 44 North Front Street, Philadelphia, Pa. 19106, as #4 Diamond braided polyester cord. Lanyard 44 of equivalent dimension and material of construction may be substituted.

Trigger latch 66 and arm 94 are formed from bar stock of carbon steel nominally 12.7 mm (0.5 inch) by 12.7 mm (0.5 inch). Arm 94 is joined to latch 66 by is joined by joining means comprised of any one or more of the electric-arc or beam welding methods; i.e., electron beam welding, flux cored arc welding, gas metal arc welding, gas tungsten arc welding, laser beam welding, resistance spot welding, or shielded metal arc welding to form the assembly. Holes 78 and 82 drilled in latch 66 are nominally 10.3 mm (¹³⁄₃₂ inch) in diameter.

Assembly of the Preferred Embodiment

The assembly procedure of the preferred embodiment may be envisioned by reference to FIGS. 1 and 2. All wire mesh panels, 22, 24, 26, 28, 30, and 34 are positioned so that wire mesh 56 is on the outside of trap 20.

Following FIG. 2, item 22 is placed on the ground with ends 60 of the adjustable clevis pins 38 pointing upward. Hair pin cotters 40 are removed. Item 30 is aligned with the rear of 22 so that ends 60 of 38 in 22 pass upward through holes 50 in 30. Hair pin cotters 40 are then inserted into each of holes 84 closest to the inside of the bottom of frame 52 forming 30.

Further following FIG. 2, items 24 and 26 are aligned with the sides 22 so that ends 60 of 38 in 22 pass upward through holes 50 in 24 and 26. Hair pin cotters 40 are then inserted into each of holes 84 closest to the inside of the bottom of frames 52 forming 24 and 26. Additional adjustable clevis pins 38 are inserted through frames 52 of 24 and 30 and 26 and 30 and secured with an equal number of hair pin cotters 40.

Still further following FIG. 2, item 28 is positioned with the tops of frames 52 forming 24, 26, and 30 so that holes 50 in each of the adjoining frames are aligned. Adjustable clevis pins 38 are then inserted though frames 52 of 24 and 28, 26 and 28, and 28 and 30 and secured with an equal number of 40.

Sliding gate 34 is slid into frame 32. Item 32 is then positioned against frames 52 of 22, 24, and 26 so that holes 50 in frames 32 and 24 and 32 and 26 are aligned. Adjustable clevis pins 38 are inserted through frame 32 and frames 52 of 24 and 26 and secured with an equal number of 40.

As shown in FIG. 8A, sliding gate 34 is raised above trigger latch 66 and 66 is rotated counter clockwise looking downward until arm 94 on trigger latch 66 supports 34. As depicted in FIG. 1 and in detail in FIGS. 8A and 8B, lanyard 44 is passed through hole 78 in 66 and tied in place and then passed through safety spring hooks 42a and 42b. Lanyard 44 is then passed across the inside of the trap 20 in front of the pan containing bait 54 and tied to 42c.

The assembler then leaves the area to avoid disturbing any feral animal that might be enticed by 54.

A feral animal, enticed by 54, enters trap 20, pushes 44 thereby causing 66 to rotate clockwise. As 66 rotates clockwise, arm 94 slides out from under 34 and 34 drops to its rest position.

As shown in FIGS. 9B and 10B, when frame 52 of 34 passes below retractable pin 88 of 36, pin 88 moves towards the front of the cage and beyond the top of upper 34. Pin 88 prevents sliding gate 34 from being raised from the inside or outside by an animal with sufficient time, intelligence, strength, or dexterity.

The assembler may then use any appropriate means to further restrain the captured feral animal prior to its removal from the trap.

Once the captured animal is removed from 20, 20 is disassembled by reversing the procedures previously described for assembly.

First Modification of the Preferred Embodiment

Square tubing 46 may be fabricated of other metals other than carbon steel, but still joined together by joining means comprised of any one or more of the electric-arc or beam welding methods; i.e., electron beam welding, flux cored arc welding, gas metal arc welding, gas tungsten arc welding, laser beam welding, resistance spot welding, or shielded metal arc welding. Such other metals are comprised of aluminum, magnesium, nickel, titanium, and the stainless steels.

Wire mesh 56 may be fabricated of other metals which may be joined to 46 by joining means comprised of any one or more of the electric-arc or beam welding methods; i.e., electron beam welding, flux cored arc welding, gas metal arc welding, gas tungsten arc welding, laser beam welding, resistance spot welding, or shielded metal arc welding.

Second Modification of the Preferred Embodiment

Square tubing 46 may be fabricated of square solid bar stock. The solid bar stock may be fabricated of any metal which may be joined together by joining means comprised of any one or more of the electric-arc or beam welding methods; i.e., electron beam welding, flux cored arc welding, gas metal arc welding, gas tungsten arc welding, laser beam welding, resistance spot welding, or shielded metal arc welding. Such other metals are comprised of aluminum, magnesium, nickel, titanium, and the stainless steels.

Third Modification of the Preferred Embodiment

Individual pieces of bar stock, not depicted, of predetermined length, diameter, and spacing may be substituted for wire mesh 56. The diameter of the bar stock is determined by the size and strength of the animal to be captured. The length of the bar stock is determined by the frames 52 forming 22, 24, 26, 28, 30 and 34.

Forth Modification of the Preferred Embodiment

Adjustable clevis pin 38 with hair pin cotter 40 are substituted by thumb screw fasteners with finger nuts. Such fasteners may be secured without the use of hand tools.

Other Modifications of the Preferred Embodiment

While only the preferred embodiment of the invention and specific modifications thereto have been described herein in detail, the invention is not limited thereby, and other modifications can be made within the scope of the attached claims.

What is claimed is:

1. A trap for humanely capturing and restraining large feral animals field erected from pre-manufactured modular components comprising:

(a) a bottom panel comprising the first modular component which includes a bottom frame of structural member means joined together by a joining means with an animal restraining means attached to said bottom frame by said joining means;

(b) a right side panel, being that side when viewing the trap from the front, comprising the second modular component which includes a right side frame of said structural member means joined together by the joining means with said animal restraining means attached to said right side frame by the joining means;

(c) a left side panel, being that side when viewing the trap from the front, comprising the third modular component which includes a left side frame of the structural member means joined together by the joining means with the animal restraining means attached to said left side frame by the joining means;

(d) a top panel comprising the fourth modular component which includes a top frame of the structural member means joined together by the joining means with the animal restraining means attached to said top frame by the joining means;

(e) a rear panel comprising the fifth modular component which includes a rear frame of the structural member means joined together by the joining means with the animal restraining means attached to said rear frame by the joining means;

(f) a sliding gate frame comprising the sixth modular component which includes a gate frame of the structural member means joined together by the joining means with sliding gate restraining means attached to said sliding gate frame by the joining means;

(g) a sliding gate panel comprising the seventh modular component which includes a front frame of the structural member means joined together by the joining means with animal restraining means attached to said front frame by the joining means;

(h) a plurality of holes of diameter slightly greater than the diameter of a frame securing means drilled through the bottom frame and each of the right side frame, the left side frame, and the rear frame, and a further plurality of said holes drilled through the right side frame and the rear frame, and through the left side frame and the rear frame, and a still further plurality of the holes drilled through the top frame and each of the right side frame, the left side frame, and the rear frame, and still another further plurality of the holes drilled through the sliding gate frame and each of the right side frame and left side frame, when the bottom frame, the right side frame, the left side frame, the rear frame, the top frame, and the sliding gate frame are placed contiguously in their predetermined locations to form said trap;

(i) a latch means for holding said sliding gate panel in the upper position;

(j) a latch releasing means for said latch means;

(k) a latch releasing support means for said latch releasing means;

(l) a locking means for the sliding gate panel;

(m) a plurality of said frame securing means of diameter slightly less than the diameter of the holes and equal to the total number of the holes less the number of the holes drilled through the bottom frame;

(n) a plurality of the frame securing means equal to the number of the holes drilled through the bottom frame and inserted into the bottom frame and attached to the bottom frame by the joining means; and (o) an animal baiting means;

whereby a cage is formed from modular components strong enough to humanely capture and restrain a large feral animal enticed inside by said animal baiting means.

2. A trap for humanely capturing and restraining large feral animals as claimed in claim 1 wherein:

(a) said structural member means is square tubing of carbon steel of outside height, outside width, and wall thickness sufficient to restrain the animal intended to be captured;

(b) said joining means is comprised of any one or more of the electric-arc or beam welding methods, electron beam welding, flux cored arc welding, gas metal arc welding, gas tungsten arc welding, laser beam welding, resistance spot welding, or shielded metal arc welding, which join two pieces of compatible metal by causing a joint of metal to form between them;

(c) said animal restraining means is wire mesh fabricated of carbon steel wire of wire diameter and aperture sufficient to restrain the animal intended to be captured;

(d) said latch means is a piece of square bar stock of carbon steel of overall outside height and outside width sufficient to support the sliding gate panel;

(e) said latch releasing means is a lanyard with one end connected to the latch means, passing in front of the animal baiting means, and the other end connected to one of a plurality of latch releasing support means;

(f) said latch releasing support means is a plurality of safety spring hooks of strength and aperture sufficient to support said lanyard;

(g) said locking means is a pop-pin of strength sufficient to prevent to the sliding gate from being raised from the inside or outside by an animal with sufficient time, intelligence, strength, or dexterity to do so;

(h) said animal baiting means is animal food sufficient to entice the animal intended to be captured to enter the trap; and (i) said frame securing means is an adjustable clevis pin of length at least two and one-half times the outside height of said square tubing, its shaft drilled with a plurality of small holes, and a hair pin cotter of outside diameter slightly less than the said small holes.

3. A trap for humanely capturing and restraining large feral animals as claimed in claim 1 wherein:

(a) said structural member means is square tubing of a metal selected from the group of metals comprising aluminum, magnesium, nickel, titanium, or the stainless steels, of overall outside height, outside width, and wall thickness sufficient to restrain the animal intended to be captured;

(b) said joining means is comprised of any one or more of the electric-arc or beam welding methods, electron beam welding, flux cored arc welding, gas metal arc welding, gas tungsten arc welding, laser beam welding, resistance spot welding, or shielded metal arc welding, which join two pieces of compatible metal by causing a joint of metal to form between them and is compatible with said metal selected from the group of metals comprising aluminum, magnesium, nickel, titanium, or the stainless steels; and (c) said animal restraining means is wire mesh fabricated of said metal wire selected from the group of metals comprising aluminum, magnesium, nickel, titanium, or the stainless steels of wire diameter and aperture sufficient to restrain the animal intended to be captured.

4. A trap for humanely capturing and restraining large feral animals as claimed in claim 1 wherein:

(a) said structural member means is square bar stock of carbon steel of overall outside height and outside width sufficient to restrain the animal intended to be captured;

(b) said joining means is comprised of any one or more of the electric-arc or beam welding methods, electron beam welding, flux cored arc welding, gas metal arc welding, gas tungsten arc welding, laser beam welding, resistance spot welding, or shielded metal arc welding, which join two pieces of compatible metal by causing a joint of metal to form between them; and (c) said animal restraining means is wire mesh fabricated of carbon steel wire of wire diameter and aperture sufficient to restrain the animal intended to be captured.

5. A trap for humanely capturing and restraining large feral animals as claimed in claim 1 wherein:

(a) said structural member means is square bar stock of a metal selected from the group of metals comprising aluminum, magnesium, nickel, titanium, or the stainless steels, of overall outside height and outside width sufficient to restrain the animal intended to be captured;

(b) said joining means is comprised of any one or more of the electric-arc or beam welding methods, electron beam welding, flux cored arc welding, gas metal arc welding, gas tungsten arc welding, laser beam welding, resistance spot welding, or shielded metal arc welding, which join two pieces of compatible metal by causing a joint of metal to form between them and is compatible with said metal selected from the group of metals comprising aluminum, magnesium, nickel, titanium, or the stainless steels; and (c) said animal restraining means is wire mesh fabricated of said metal wire selected from the group of metals comprising aluminum, magnesium, nickel, titanium, or the stainless steels of wire diameter and aperture sufficient to restrain the animal intended to be captured.

6. A trap for humanely capturing and restraining large feral animals as claimed in claim 1 wherein:

(a) said animal restraining means is bar stock fabricated of carbon steel sufficient to restrain the animal intended to be captured.

7. A trap for humanely capturing and restraining large feral animals as claimed in claim 1 wherein:

(a) said frame securing means is a plurality of thumb screw fasteners of length at least two and one-half times the outside height of said square tubing and the same number of a plurality of finger nuts.

8. A method for humanely capturing and restraining large feral animals in a trap comprising the steps of:

(a) transporting six (6) pre-fabricated wire mesh panels and one (1) sliding gate frame to the place where said large feral animals are to be trapped;

(b) placing a bottom panel on the ground with a plurality of frame securing means, equal to the number of holes drilled through said bottom frame attached to the frame by a joining means, pointing upward;

(c) placing a right side panel, being that side when viewing said trap from the front, contiguously to the bottom panel such that a plurality of said frame securing means pointing upward are aligned with the same number of a plurality of holes pre-drilled in said right side panel;

(d) joining together said right side panel to the bottom panel by a plurality of the frame securing means equal to the plurality of holes pre-drilled in the right side panel;

(e) placing a left side panel, being that side when viewing the trap from the front, contiguously to the bottom panel such that a plurality of said frame securing means pointing upward are aligned with the same number of a plurality of holes pre-drilled in said left side panel;

(f) joining together said left side panel to the bottom panel by a plurality of the frame securing means equal to the plurality of holes pre-drilled in the left side panel;

(g) placing a rear panel contiguously to the bottom panel, the right side panel, and the left side panel such that a plurality of said frame securing means pointing upward from the bottom panel are aligned with the same number of a plurality of holes pre-drilled in the bottom frame of said rear panel, and further such that a plurality of holes pre-drilled in the frame of the rear panel are aligned with the same number of holes pre-drilled in the right side panel and left side panel;

(h) joining together the rear panel to the bottom panel, the rear panel to the right side panel, and the rear panel to the left side panel, by a plurality of the frame securing means equal to the plurality of holes pre-drilled in the rear panel;

(i) placing a top panel contiguously to the right side panel, the left side panel, and the rear panel such that a plurality of holes pre-drilled in said top panel are aligned with the same number of a plurality of holes pre-drilled in the top frame of the right side panel, the left side panel, and the rear panel;

(j) joining together the top panel to the right side panel; the top panel to the left side panel, and the top panel to the rear panel by a plurality of the frame securing means equal to the plurality of holes pre-drilled in the top panel;

(k) placing a sliding gate frame contiguously to the right side panel and to the left side panel such that a plurality of holes pre-drilled in said sliding gate frame are aligned with the same number of a plurality of holes pre-drilled in the front frame of the right side panel and the front frame of the left side panel;

(l) joining together the sliding gate frame to the right side panel and to the left side panel by a plurality of the frame securing means equal to the plurality of holes pre-drilled in the sliding gate frame;

(m) inserting a sliding gate panel into the sliding gate frame;

(n) lowering the sliding gate panel to its lower-most position;

(o) securing a latch means to the front frame of the top panel with the frame securing means such that said latch means is free to rotate about the frame securing means;

(p) placing an animal baiting means inside and towards the rear of the trap;

(q) connecting a latch releasing means to the latch means;

(r) passing said latch releasing means through a plurality of latch releasing support means;

(s) connecting the opposite end of the latch releasing means to one of said plurality of latch releasing support means such that the latch releasing means passes in front of said animal baiting means;

(t) retracting a locking means for the sliding gate so that it may be raised;

(u) raising the sliding gate panel to a point such that its lowermost frame is above the latch means;

(v) rotating the latch means until it obstructs the downward movement of the sliding gate panel; and (w) resting the sliding gate panel on the latch means;

whereby a cage is formed from modular components strong enough to humanely capture and restrain a large feral animal enticed inside by the animal baiting means.

9. A trap for humanely capturing and restraining large feral animals as claimed in claim 8 wherein:

(a) said joining means is comprised of any one or more of the electric-arc or beam welding methods, electron beam welding, flux cored arc welding, gas metal arc welding, gas tungsten arc welding, laser beam welding, resistance spot welding, or shielded metal arc welding, which join two pieces of compatible metal by causing a joint of metal to form between them;

(b) said latch means is a piece of square bar stock of carbon steel of overall outside height and outside width sufficient to support the sliding gate panel;

(c) said latch releasing means is a lanyard with one end connected to the latch means, passing in front of the animal baiting means, and the other end connected to one of a plurality of safety spring hooks;

(d) said latch releasing support means is a plurality of safety spring hooks of strength and aperture sufficient support said lanyard;

(e) said locking means is a pop-pin of strength sufficient to prevent to the sliding gate from being raised from the inside or outside by an animal with sufficient time, intelligence, strength, or dexterity to do so;

said animal baiting means is animal food sufficient to entice the animal intended to be captured to enter the trap; and said frame securing means is an adjustable clevis pin of length at least two and one-half times the outside height of said square tubing, its shaft drilled with a plurality of small holes, and a hair pin cotter of outside diameter slightly less than the said small holes.

* * * * *